(12) United States Patent
Wiegers (10) Patent No.: US 7,468,692 B1
(45) Date of Patent: Dec. 23, 2008

(54) METHOD AND APPARATUS FOR INTERCONNECTING NAVIGATION COMPONENTS USING A MULTI-PIN CONNECTOR

(75) Inventor: Michael R. Wiegers, Paola, KS (US)

(73) Assignee: Garmin Ltd. (KY)

( * ) Notice: Subject to any disclaimer, the term of this patent is extended or adjusted under 35 U.S.C. 154(b) by 207 days.

(21) Appl. No.: 11/079,976

(22) Filed: Mar. 15, 2005

(51) Int. Cl.
G01S 1/00 (2006.01)
(52) U.S. Cl. ................................. 342/357.06
(58) Field of Classification Search ................ 342/419, 342/357.01, 357.06, 357.12; 701/207, 213, 701/215
See application file for complete search history.

(56) References Cited

U.S. PATENT DOCUMENTS 5,986,547 A * 11/1999 Korver et al. ............... 340/500
6,007,372 A * 12/1999 Wood ......................... 439/502
6,484,079 B2 * 11/2002 Buckelew et al. ............. 701/29
6,844,846 B1 * 1/2005 Riday ...................... 342/357.1
2002/0145043 A1 * 10/2002 Challa et al. ........... 235/462.01
2003/0095525 A1 * 5/2003 Lavin et al. ................. 370/338

* cited by examiner

*Primary Examiner*—Dao L Phan
(74) *Attorney, Agent, or Firm*—Kevin E. West; Samuel M. Korte (57) ABSTRACT

A navigation device comprises a data receiver and a Global Positioning System (GPS) navigation device which are interconnected with a multi-pin connector. The data receiver provides an intermediate voltage level through the multi-pin connector, and a microprocessor within the GPS navigation device identifies a type of data transmission system associated with the data receiver. A plurality of intermediate voltage levels may be output wherein each level corresponds to a different type of transmitted data. The data receiver may further comprise a resistor network having a resistance value based on the type of transmitted data.

16 Claims, 6 Drawing Sheets

METHOD AND APPARATUS FOR INTERCONNECTING NAVIGATION COMPONENTS USING A MULTI-PIN CONNECTOR

BACKGROUND OF THE INVENTION

This invention relates generally to Global Positioning System ("GPS") navigation systems, and more particularly to methods and apparatus for interconnecting additional data transmission systems with the GPS navigation system.

Electronic navigation devices employing Global Positioning System ("GPS") receivers are known. The GPS includes a plurality of satellites that are in orbit about the earth. The orbit of each satellite is not necessarily synchronous with the orbits of other satellites and, in fact, is likely asynchronous. The GPS receiver device receives spread spectrum GPS satellite signals from the various satellites. The spread spectrum signals continuously transmitted from each satellite utilize a highly accurate frequency standard accomplished with an extremely accurate atomic clock. Each satellite, as part of its data signal transmission, transmits a data stream indicative of that particular satellite. The GPS receiver device acquires spread spectrum GPS satellite signals from at least three satellites to calculate its two-dimensional position by triangulation. Acquisition of an additional signal, resulting in signals from a total of four satellites, permits the GPS receiver device to calculate its three-dimensional position. In this manner, an electronic navigation device employing a GPS receiver has the ability to accurately compute the position of the device in real time, even as the device moves.

GPS receivers may also have the ability to receive and process data from the Wide Area Augmentation System ("WAAS"). The WAAS uses a system of satellite and ground stations that provide GPS signal corrections to provide a consumer with better position accuracy.

Many handheld electronic navigation devices are presently on the market. Some consumers readily carry such handheld electronic navigation devices with them when they are traveling in their vehicles in order to enjoy the benefit of navigational aids while driving. By way of example only, the navigation device may be designed to plug into the 12 Volt outlet in an automobile. The handheld electronic navigation devices may also include a battery and be used when on foot, such as when hiking or shopping.

Consumers also enjoy technologies such as satellite radio data. Satellite radio data is provided by companies such as XM and Sirius, and offer the consumer the ability to receive radio stations, traffic, weather, stock reports, and other information via a combination of satellites and repeaters installed on the ground. The consumer can choose from many different stations and tailor the content to their tastes.

Real-time traffic and weather information is also broadcast over the FM radio data system by, for example, the Traffic Message Channel ("TMC") in Europe and Clear Channel Communications, Inc. (CC) in the United States. Thus, the GPS, XM, CC, and TMC systems each transmit data using unique data transmission systems, or schemes. It should be understood that other data transmission systems exist and/or may be in development which the consumer may wish to access for entertainment, assistance, and/or information. Each system has the potential for transmitting information useful to a consumer, but the full benefit of each system cannot be realized by using the systems separately.

Therefore, a need exists for a navigation system which integrates GPS navigation information with data received from additional data transmission systems. Furthermore, there exists a need for an apparatus to easily accomplish the integration of external data transmission systems with little or no input from the consumer. Certain embodiments of the present invention are intended to meet these needs and other objectives that will become apparent from the description and drawings set forth below.

BRIEF DESCRIPTION OF THE INVENTION

An electronic navigation device comprises a data receiver and a Global Positioning System (GPS) navigation device having at least one microprocessor. A multi-pin connector connects the data receiver and the navigation device. The microprocessor identifies a type of data transmission system associated with the data receiver.

An apparatus comprises a data receiver for receiving a type of transmitted data. A receptacle for receiving a plug is mounted within the data receiver. Multiple pins are containable held within the receptacle. A first pin corresponds to an ID pin for outputting one of a plurality of voltage levels. Each of the voltage levels correspond to a different type of transmitted data. A resistor network has a resistance value based on the type of transmitted data. The resistor network has a first end connected to a ground and a second end connected to the first pin.

A navigation system comprises a navigation device for providing navigation based data. A receiver component receives data transmitted by a first type of data transmission system. A cable connects the navigation device and receiver component. The receiver component provides a first type of data and an intermediate voltage level through the cable to the navigation device. The navigation device identifies the first type of data transmission system based on the intermediate voltage level.

A navigation system comprises a GPS based navigation device for receiving GPS based data. A display is integrated with the navigation device. A receiver component receives non-GPS based data, and the display displays data corresponding to the non-GPS based data.

A method for using a navigation device comprises interconnecting a navigation device and a receiver component with a USB cable having 5 pins at each end. The navigation device receives GPS based data and the receiver component receives non-GPS based data having a data transmission type. An initial voltage is output on a $V_{BUS}$ pin from the navigation device, and is received on a corresponding $V_{BUS}$ pin at the receiver component. An intermediate voltage based on the initial voltage is output on an ID pin from the receiver component and received on a corresponding ID pin at the navigation device. The navigation device identifies the data transmission type based on the intermediate voltage. A route is calculated based on the GPS based data.

A navigation system comprises a navigation device for receiving GPS based data. A multi-pin connector is housed within the navigation device and is configured to receive a Universal Serial Bus (USB) type plug. A microprocessor is housed within the navigation device for identifying an external device after the external device is interconnected with the navigation device through the multi-pin connector.

The foregoing summary, as well as the following detailed description of certain embodiments of the present invention, will be better understood when read in conjunction with the appended drawings. It should be understood that the present invention is not limited to the arrangements and instrumentality shown in the attached drawings.

DETAILED DESCRIPTION OF THE INVENTION

Figure 1:
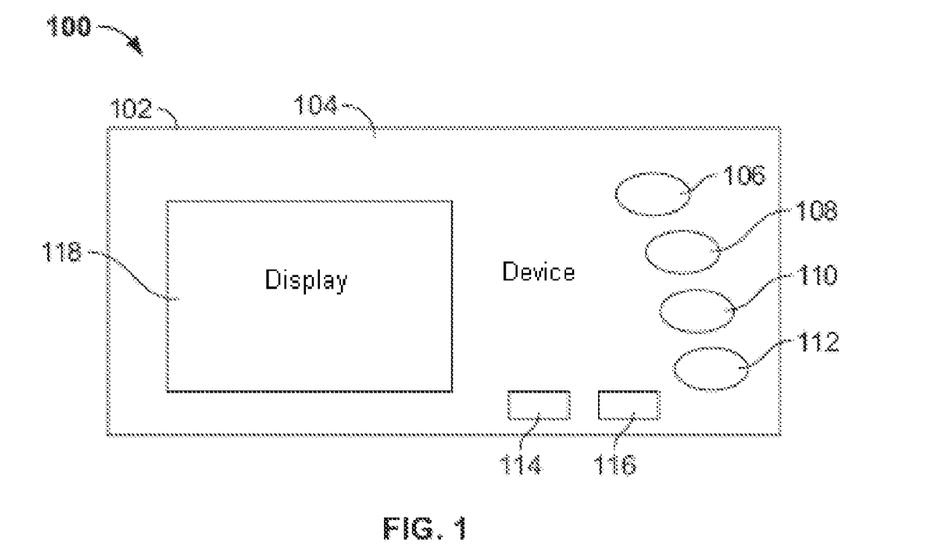
FIG. 1 illustrates a view of an electronic navigation device formed in accordance with an embodiment of the present invention.

FIG. 1 illustrates a view of an electronic navigation device 100 formed in accordance with an embodiment of the present invention. The navigation device 100 can be portable and may be utilized in any number of implementations such as automobile, personal marine craft, and avionic navigation. Alternatively, the navigation device 100 may be installed within a movable structure, such as in the dashboard of an automobile, or the navigation device 100 may be carried by a user traveling on foot.

A front view of the navigation device 100 is provided showing the navigation device 100 having a generally rectangular housing 102. The housing 102 is constructed of resilient material and may be rounded for aesthetic and ergonomic purposes. A control face 104 has access buttons 106-112, input/output ("I/O") ports 114 and 116, and a display 118. Although the I/O ports 114 and 116 are illustrated on the control face 104, the I/O ports 114 and 116 may be located on a back or side (not shown) of the navigation device 100. I/O ports 114 and 116 may be multi-pin connectors such as Universal Serial Bus ("USB") ports, or other I/O ports such as IEEE 1394 or RS232. Although two I/O ports 114 and 116 are shown, it should be understood that more or less than two I/O ports 114 and 116 may be provided. Additional ports (not shown) may be provided for power connections and external antennas. By way of example only, the display 118 may be responsive to touch and/or an LCD display which is capable of displaying both text and graphical information.

Figure 2:
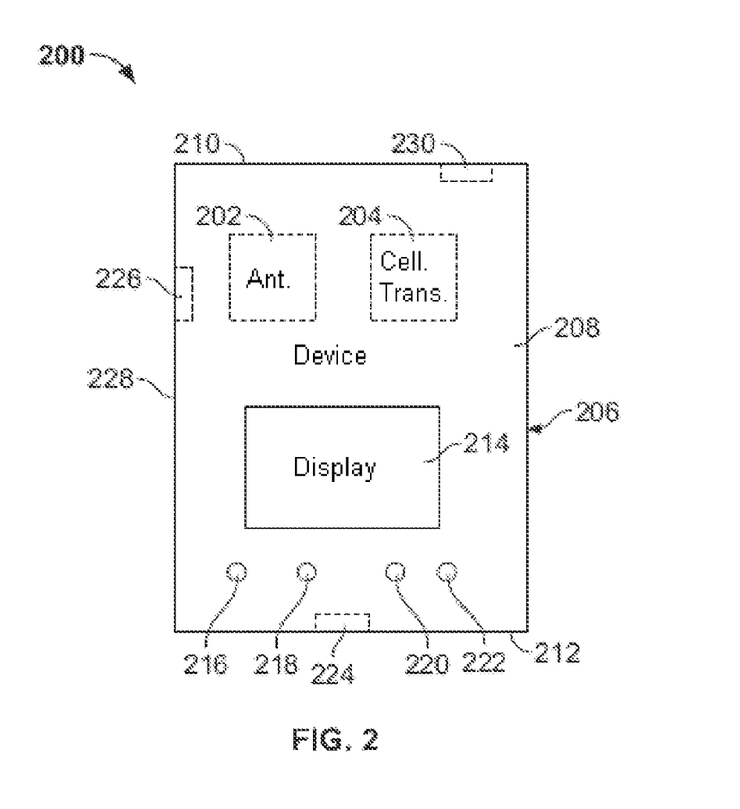
FIG. 2 illustrates a view of an electronic navigation device incorporated within a personal digital assistant ("PDA") formed in accordance with an embodiment of the present invention.

FIG. 2 illustrates a view of an electronic navigation device 200 incorporated within a personal digital assistant ("PDA") formed in accordance with an embodiment of the present invention. An internal integrated GPS patch antenna 202 and a cellular transceiver 204 may be contained in a housing 206. The housing 206 is generally rectangular with a low profile and has a front face 208 extending from a top end 210 to a bottom end 212. Mounted on the front face 208 is a display 214, which is touch sensitive and responsive to a finger touch or a stylus, as is known in the art. Input buttons 216-222 are illustrated as being positioned toward the bottom end 212, although input buttons 216-222 may be positioned in other locations on the navigation device 200. I/O ports 224 and 226 are illustrated as being positioned along the bottom end 212 and along a side edge 228 of the housing 206, respectively. Again, the I/O ports 224-226 may be multi-pin connectors such as USB or RS232 connectors. A headphone jack 230 is positioned along the top end 210 of the housing 206. It should be understood that I/O ports 224 and 226, and the headphone jack 230, are not limited in placement to the illustration provided in FIG. 2. Additionally, it should be understood that the navigation devices 100 and 200 as illustrated in FIGS. 1 and 2, respectively, do not limit the scope of the invention, and that additional devices incorporating electronic navigation capabilities, such as a cellular telephone, may also be utilized.

Figure 3:
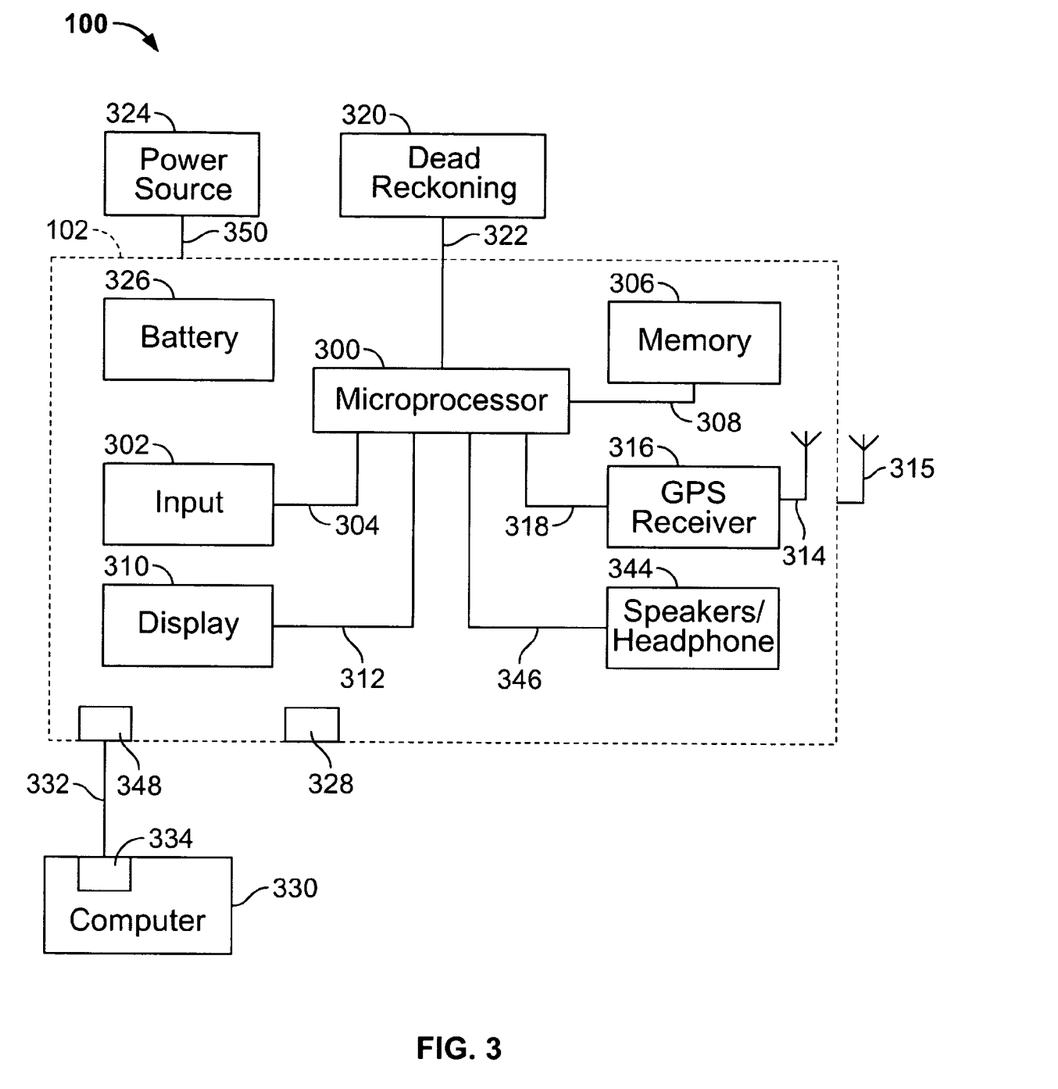
FIG. 3 illustrates a block diagram of electronic components within a housing which are utilized by the navigation device in accordance with an embodiment of the claimed invention.

FIG. 3 illustrates a block diagram of electronic components within a housing, such as housing 102, which are utilized by navigation device 100 in accordance with an embodiment of the claimed invention. A microprocessor 300 is connected to an input 302 via line 304. The input 302 may be a keypad, access buttons 106-112, a mouse, a remote control device, a touchscreen, and/or a microphone for receiving voice commands. Therefore, it should be understood that although only one input 302 is illustrated, there may be more than one input 302.

The microprocessor 300 communicates with memory 306 via line 308. The memory 306 is adapted to store and/or house a set of executable instructions, programs, and/or program modules. The memory 306 is further adapted to store or house navigation related data and software operable to perform routing algorithms. The navigation related data includes cartographic data, which further includes a number of locations and data indicative of thoroughfares of a plurality of types connecting certain ones of the locations. The navigation related data may include a calculated route between at least two of the locations. The software stored or housed within memory 306 includes software operable to perform one or more applications for navigation, including, but not limited to, software operable to find points of interest. By way of example only, the navigation related data may include a number of waypoints, a planned route, and points of interest. The points of interest may include geographical and historical points of interest, and entertainment, dining, and lodging venues. The navigation related data may also include automobile, marine craft, pedestrian, and hiking navigation data. The memory 306 may be further adapted to store or house software operable for adding a waypoint as an address in the address book, adding a point of interest as an address in the address book, and storing a planned route.

The microprocessor 300 communicates with display 310 via line 312. An antenna 314 and GPS receiver 316 are connected to the microprocessor 300 via line 318. It should be understood that the antenna 314 may be a GPS patch antenna or a helical antenna, and may be internal or external with respect to the housing 102. If the navigation device 100 is installed within a vehicle, the antenna 314 may also be installed, such as on the roof or rear window of the vehicle. Alternatively, an additional antenna 315 may be external to the housing 102 and may be temporarily placed on the dash of the car.

In addition, at least one dead reckoning component 320 may be connected to the microprocessor 300 via line 322. The dead reckoning component 320 may be located outside the housing 102, and may include, by way of example and not by way of limitation, a rate gyro, an odometer, a pedometer, an accelerometer, a vehicle speedometer, ABS wheel speed sensors, and/or vehicle backup lights. It should be understood that more than one dead reckoning component 320 may be used. Each dead reckoning component 320 may be connected via an independent line (not shown), or may share and be connected via the line 322. One of ordinary skill in the art will appreciate that other dead reckoning components may be suitable and are considered equally within the scope of the present invention.

The housing 102 of the navigation device 100 is connected to a power source 324 via line 350. The power source 324 may be a car battery if the navigation device 100 is mounted within a vehicle, an electrical wall outlet or other power source. Additionally, a battery 326 may be provided within the housing 102.

One or more I/O ports 328 are provided on the housing 102 for interconnecting the navigation device 100 with other electronic devices. The I/O port 328 may be a multi-pin connector, such as a USB connector, or a different type of I/O connector as discussed previously.

In FIG. 3, an external computer 330 is connected from a multi-pin connector 334 on the computer 330 to a multi-pin connector 348 on the navigation device 100 via a cable 332. The external computer 330 may be used to download navigational data and calculated routes into the memory 306.

Alternatively, either one I/O port 328 or one multi-pin connector 348 may be provided and used to connect all devices to the navigation device 100 one at a time. In the aforementioned configuration, either the computer 330 may be connected to the navigation device 100 or an external receiver, such as an XM radio receiver, may be connected to the navigation device 100, but not at the same time.

Figure 4:
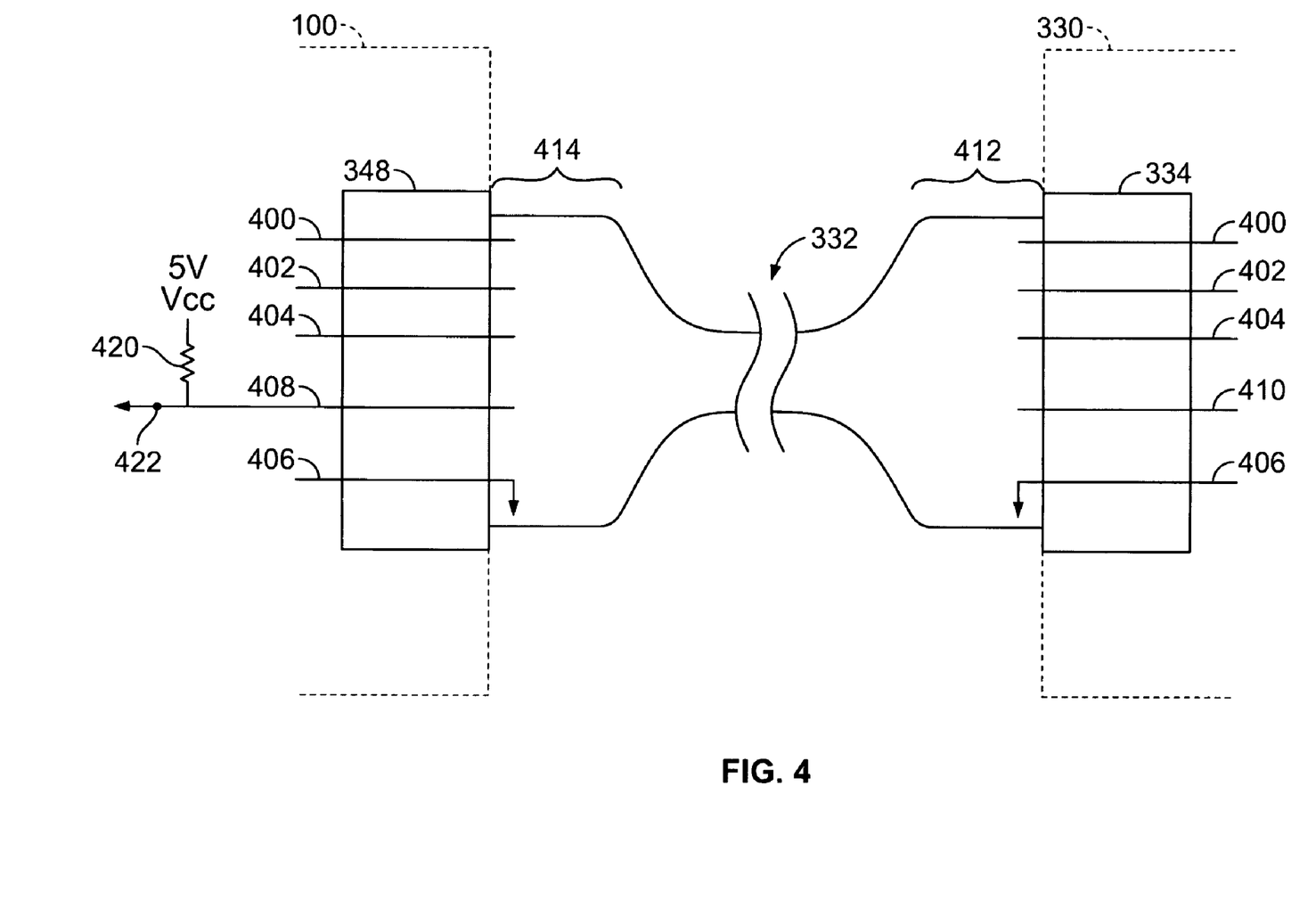
FIG. 4 illustrates connections between the navigation device and the computer formed in accordance with an embodiment of the present invention.

FIG. 4 illustrates connections between the navigation device 100 and the computer 330 in accordance with an embodiment of the present invention. The multi-pin connectors 348 and 334 are USB type connectors which are known in the art. There are two different types of USB connectors comprising a plug and a receptacle. Typically, a first type of USB receptacle is mounted within a master device and a second type of USB receptacle is mounted within a slave device. For the following discussion, the terms connector and receptacle may be used interchangeably.

The multi-pin connector 348, which is integrated with the navigation device 100, is a USB mini-B, or slave, type receptacle. The multi-pin connector 334, which is integrated with the computer 330, is a USB mini-A, or master, type receptacle. The cable 332 may be a standard USB cable having a mini-A type plug 412 and a mini-B type plug 414 at either end. The USB receptacles and plugs are configured in such a manner that USB master type receptacles (multi-pin connector 334) only accept the master type plug 412 end of the cable 332, and USB slave type receptacles (multi-pin connector 348) only accept the slave type plug 414 end of the cable 332.

When the navigation device 100 is connected to the computer 330 as illustrated in FIG. 4, the navigation device 100, computer 330, and USB cable 332 may be thought of as a USB system. In a USB system, there is one host, or master component, and one or more hubs, or slave components. In FIG. 4, the computer 330 operates as the master and the navigation device 100 operates as the slave.

The multi-pin connectors 348 and 334 each have five pins corresponding to five wires within the USB cable 332. Within a USB system, the master component may provide the power source for the slave component. Therefore, a $V_{BUS}$ pin 400 may be used to provide power from the computer 330 to the navigation device 100. As discussed previously, the navigation device 100 may have a battery 326 and/or be connected to an external power source 324, thus not requiring power from the master component. Data pins, D+ pin 402 and D− pin 404, are used for data transfer between the computer 330 and the navigation device 100. Ground pin 406 provides a common ground reference between the computer 330 and the navigation device 100.

The multi-pin connectors 348 and 334 each have a fifth pin, ID pin 408 and ID pin 410, respectively. ID pins 408 and 410 share a common wire within the USB cable 332 but have different item numbers in FIG. 4 for clarity. In current USB systems, the ID pins 408 and 410 are not used. The ID pin 410 may be tied to the ground pin 406 within the computer 330 to indicate the master status. Within the navigation device 100, the ID pin 408 may be tied to a resistor network 420 which is connected to Vcc, thus providing a known voltage level at point 422. The voltage level Vcc of 5 volts is exemplary only, and it should be understood that other voltage levels may be used.

Figure 5:
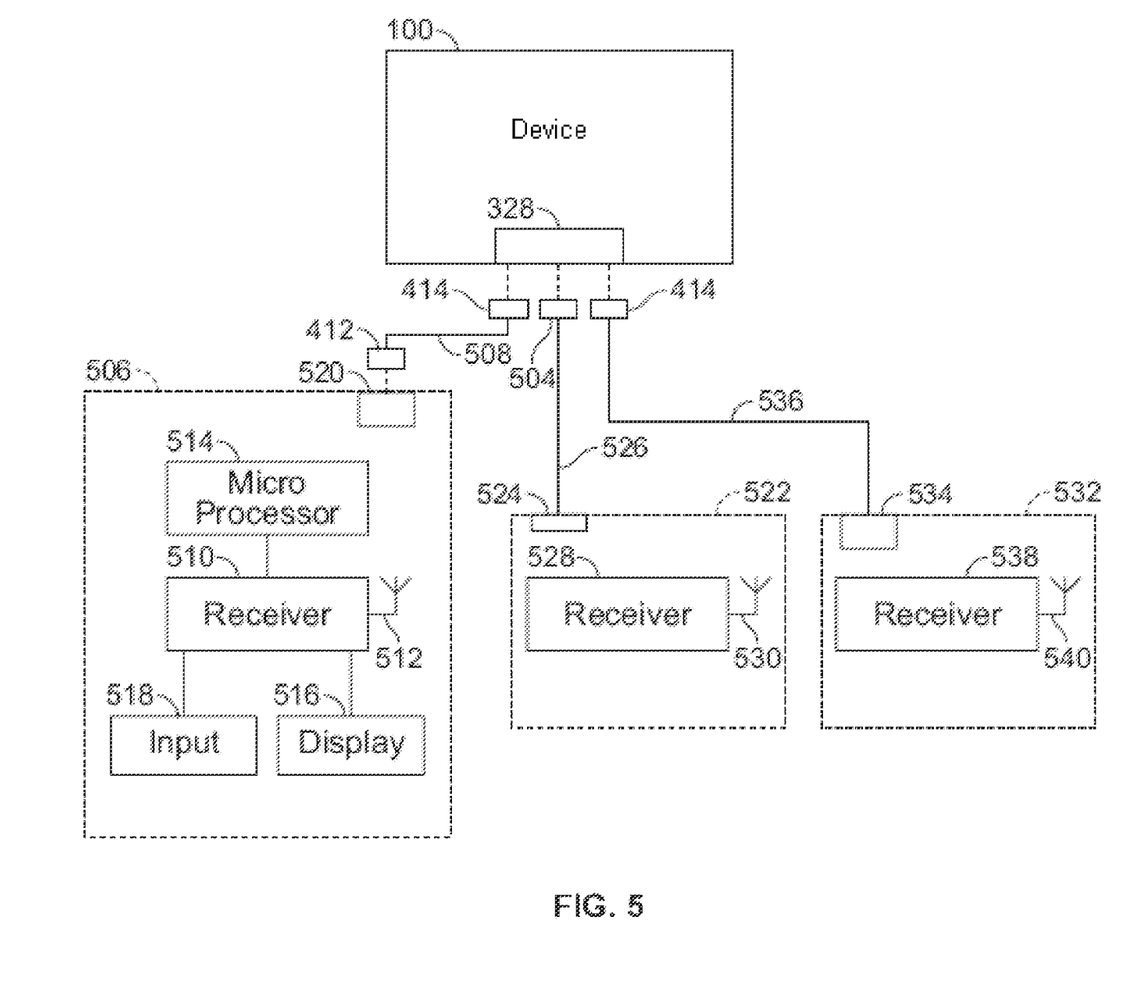
FIG. 5 illustrates the navigation device interconnected with one or more receiver components in accordance with an embodiment of the present invention.

FIG. 5 illustrates the navigation device 100 interconnected with one or more receiver components 506, 522 and 532 in accordance with an embodiment of the present invention. The navigation device 100 can integrate different types of data with the GPS data and provide a single presentation of data which is more functional, useful and easier for the consumer to understand quickly. In addition, non-receiver based components such as an MP3 player, keyboard, mouse, or disk drive may be connected via USB or other type of cable appropriate to the connector type, allowing the navigation device 100 to control the functionality of the connected component. The navigation device 100 may operate as a USB slave type device when interconnected with a USB master type device, such as computer 330. However, as discussed below in connection with FIGS. 5 and 6, the navigation device 100 may operate as a USB master type device when interconnected with other devices while still utilizing the commonly available USB master/slave connectors and plugs as previously described.

The navigation device 100 may have a single USB multi-pin connector or I/O port 328 as illustrated, allowing the computer 330 or one of the receiver components 506, 522 or 532 to be connected one at a time. The I/O port 328 may be located on a back or side of the navigation device 100, as discussed previously. Alternatively, more than one USB multi-pin connector or I/O port 328 may be provided, as illustrated in FIG. 3. The I/O port 328 is a USB slave type receptacle, although it should be understood that other types of connectors and receptacles may be used. In addition, two different embodiments for interconnecting the navigation device 100 and the receiver components 506, 522 and 532 are discussed below.

Receiver component 506 has a multi-pin connector 520 which is a USB master type receptacle, and is connected to the navigation device 100 via USB cable 508 and the I/O port 328. Therefore, the USB cable 508 would connect a mini-A type connector 412 to the receiver component 506 at the multi-pin connector 520, and a mini-B type connector 414 to the navigation device 100 at the I/O port 328. The receiver component 506 receives data of a type associated with a specific data transmission system. By way of example only, the receiver component 506 may comprise components such as a receiver 510 for receiving satellite radio data, such as XM or Sirius data. The receiver component 506 further includes an antenna 512 appropriate to the type of data being received, a microprocessor 514, a display 516 and at least one input 518. Alternatively, as the navigation device 100 controls the overall functionality of the receiver component 506, the receiver component 506 may not have the display 516 or input 518.

Receiver component 522 has a wire harness 526 hardwired to the receiver component 522 at connection point 524. The wire harness 526 may include a plug 504, which is a male type plug such as the USB mini-B type plug, for connecting to the navigation device 100 through I/O port 328. The wire harness 526, fixed and attached to the receiver component 522, effectively forms a USB cable assembly. The receiver component 522 may comprise a receiver 528 for receiving FM radio data, such as Traffic Message Channel ("TMC") data, and an antenna 530 appropriate to the type of data being received.

Receiver component 532 may be connected to the navigation device 100 via connector 534 with either the mini-B type connector 414 and USB cable 536, as used with the receiver component 506, or a wire harness, as used with the receiver component 522. The receiver component 532 may comprise a receiver 538 for receiving other data of interest to a user, such as audio mono data, audio stereo data, non-GPS based navigational data, traffic management information data, other traffic data, weather data, and the like. Thus, the receiver components 506, 522, and 532 each receive a different type of transmitted data. It should be understood that not all of the components necessary to activate the receiver components 506, 522 and 532 are illustrated.

It is neither practical nor desired to provide a separate multi-pin connector or I/O port for every type of receiver component 506, 522, and 532 which may be used with the navigation device 100. It may be desirable to provide a single multi-pin connector on the navigation device 100 to minimize space, cost and circuitry complexity. For example, a consumer may use the navigation device 100 within the United States and receive XM data. The traffic and weather XM data is integrated with the GPS data by the navigation device 100. The consumer may travel to Europe and wish to use the same navigation device 100 to receive data from the TMC data transmission system. The TMC data is integrated with the GPS data by the navigation device 100. XM data and TMC data require different data decoding schemes, and thus the navigation device 100 must be able to recognize the type of transmission data a receiver component is receiving in order to properly decode and process the transmission data.

Alternatively, one or more receiver components 506, 522 and 532 may be integral to the navigation device 100 and contained within the housing 102. Also, two or more receiver components 506, 522 and 532 may be combined together in an external housing (not shown), requiring only a single connector and/or cable to connect to the navigation device 100.

Figure 6:
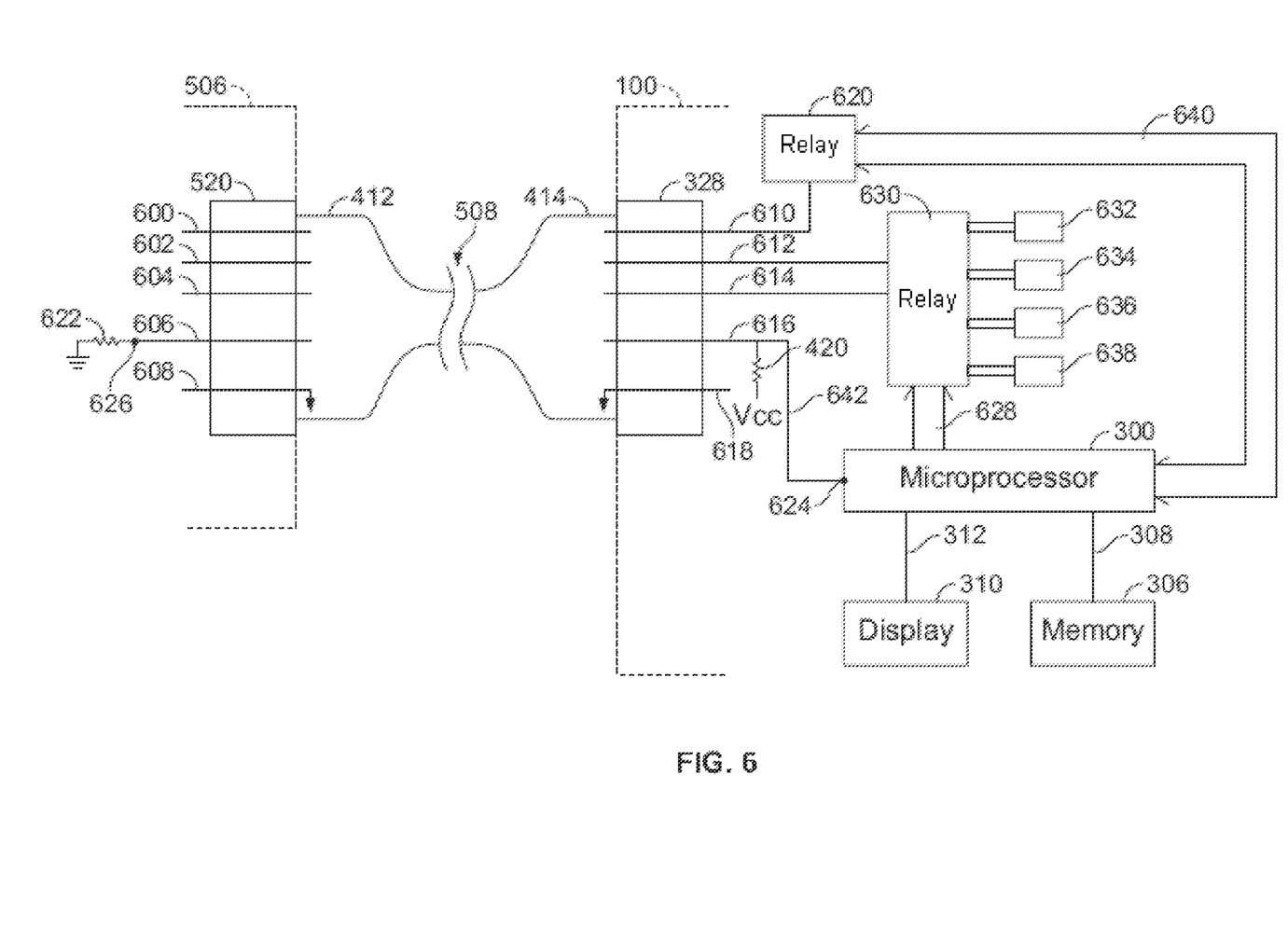
FIG. 6 illustrates the navigation device and the receiver component interconnected by USB cable in accordance with an embodiment of the present invention.

FIG. 6 illustrates the navigation device 100 and the receiver component 506 interconnected by USB cable 508 in accordance with an embodiment of the present invention. The navigation device 100 recognizes the receiver component 506, and the navigation device 100 effectively acts as the master device.

The multi-pin connector 520 of the receiver component 506 has five pins as discussed previously: $V_{BUS}$ pin 600, D+ pin 602, D− pin 604, ID pin 606, and ground pin 608. The I/O port 328 of the navigation system 100 has five pins as well: $V_{BUS}$ pin 610, D+ pin 612, D− pin 614, ID pin 616, and ground pin 618.

The ID pin 606 on the receiver component 506 is tied to a resistor network 622 which is connected to ground. The resistor network 622 may be included within the multi-pin connector 520 or on a circuit board within the receiver component 506. The resistor network 622 has a resistance value specific to the data transmission type received by the receiver component 506 and sent to the navigation device 100. For example, a receiver component 506 for use with the XM data transmission system would utilize a resistor network 622 having a resistance value equal to A ohms, while a receiver component 506 for use with the TMC data transmission system would utilize a resistor network 622 having a resistance value equal to B ohms, wherein A and B are different resistance values. Therefore, each data transmission system may be assigned a specific resistance value for the resistor network 622. It should be understood that implementations other than a single resistor are envisioned and may be utilized to provide the described functionality. For example, a 1 K ohm resistor may be used in an XM satellite radio receiver, while a 3.74 K ohm resistor may be used in a TMC receiver.

Alternatively, a specific resistance value may be assigned to a component that does not receive data, such as an MP3 player. In this manner, a number of other types of electronic components may be interconnected to, and identified by, the navigation device 100.

Figure 7:
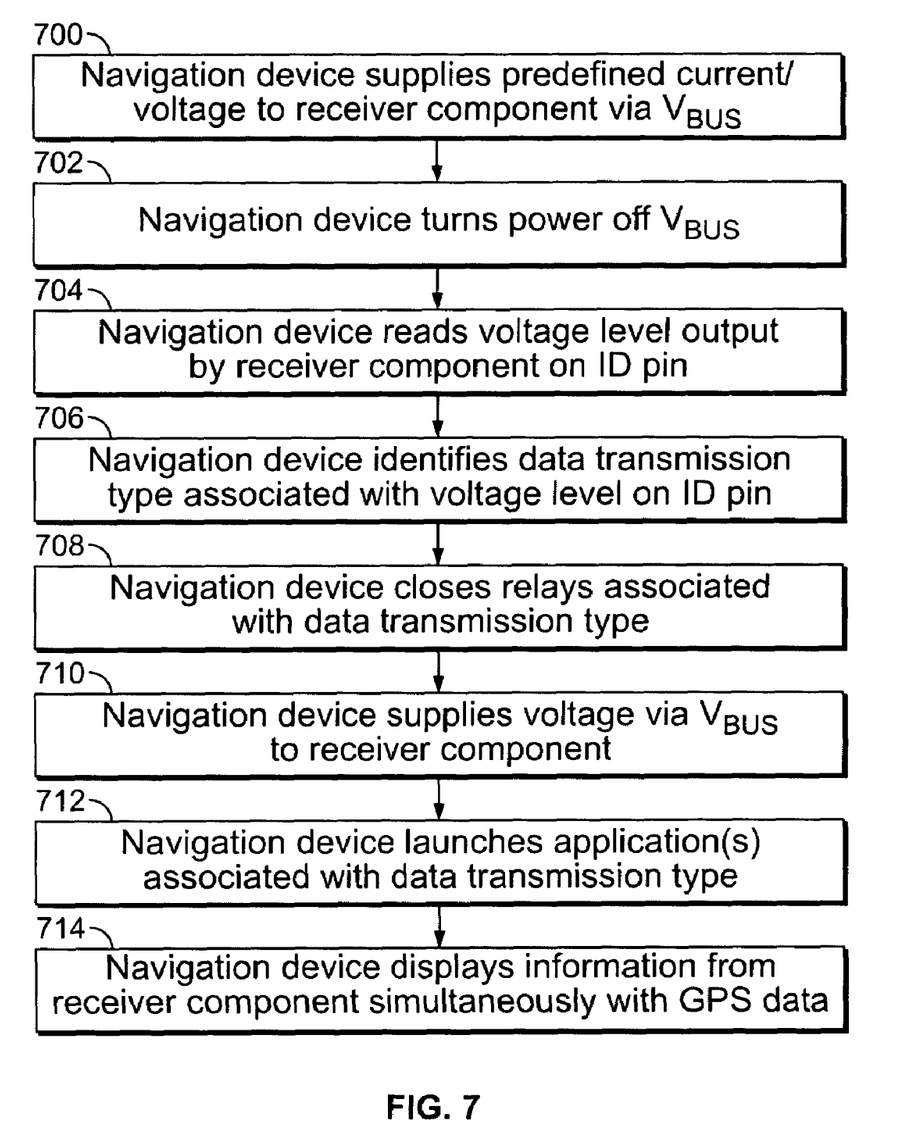
FIG. 7 illustrates a flow chart of a method for identifying the type of data transmission system associated with the receiver component interconnected with the navigation system in accordance with an embodiment of the present invention.

FIG. 7 illustrates a flow chart of a method for identifying the type of data transmission system associated with the receiver component 506 interconnected with the navigation system 100 in accordance with an embodiment of the present invention. The navigation device 100 monitors the I/O port 328 and detects when an external device is connected. The method of FIG. 7 starts after the USB cable 508 has been plugged into both the navigation device 100 and the receiver component 506, and will be discussed together with FIG. 6.

In step 700, the microprocessor 300 of the navigation device 100 directs power relays 620 via control signals 640 to output a predefined current/voltage on $V_{BUS}$ 610, which is received at $V_{BUS}$ 600 of the receiver component 506. The navigation device 100 outputs the same predefined current/voltage every time a receiver component 506 is interconnected with the navigation device 100. By way of example only, 5V DC at 1 Amp may be output on $V_{BUS}$ 610.

In step 702, the microprocessor 300 directs the power relays 620 via the control signals 640 to momentarily remove the predefined current/voltage from $V_{BUS}$ 610. For example, the predefined current/voltage may be removed from $V_{BUS}$ 610 for approximately 1 second.

In step 704, the microprocessor 300 immediately reads the voltage level on the ID pin 616, such as at input 624 via line 642, which corresponds to the voltage level at point 626 on ID pin 606 within the receiver component 506. The resistor network 622 within the receiver component 506 and the resistor network 420 within the navigation device form a voltage divider. The amount of time during which the power is removed in step 702 must be long enough for the microprocessor 300 to measure the voltage level. By removing power, potential ground voltage offset problems may be eliminated.

In step 706, the microprocessor 300 identifies the data transmission type associated with the voltage level on the ID pin 616 read during step 704. There is a range of intermediate voltage levels that may be identified between the 0 volt level indicating master status and the 5 volt level indicating slave status. At least ten different intermediate voltage levels may be identified by the microprocessor 300. The resistance value of the resistor network 622 associated with each different data transmission type is based on a desired intermediate voltage level. As a tolerance is necessary to correctly identify the intermediate voltage level, the number of intermediate voltages is not infinite. For example, resistance values in K ohms may be used, such as 1, 2.21, 3.74, 5.76, 8.25, 12.1, 17.4, 26.7, 45.3, and 100 K ohms.

In step 708, the microprocessor 300 sends control signals 628 to a bank of relays 630. The bank of relays 630 may be semiconductor or mechanical relays. Alternatively, a universal decoder chip comprising the bank of relays 630 may be used. The universal decoder chip would further comprise the logic and ability necessary to identify and switch the data appropriately. In addition, the D+ and D− lines may be connected to all decoders and then the desired decoding function may be enabled. The bank of relays 630 connect the data pins, D+ pin 612 and D− pin 614, to one data decoder 632-638. Each data decoder 632-638 processes a different type of transmission data. Therefore, based on the identified data transmission type, the control signals 628 command the appropriate relays to close, and the data from the receiver component 506 is sent through the bank of relays 630 to the appropriate data decoder 632-638. Additional data decoders 632-638 may be added to process additional types of transmission data. In other words, a separate data decoder 632-638 may be provided corresponding with each of the different intermediate voltage levels discussed previously. For example, ten different data decoders 632-638 may be provided.

In addition, a multiplexer (not shown) or other logic device may be provided to determine priority between different receiver units when more than one receiver unit is connected, or to coordinate and correctly interconnect each receiver component with the appropriate data decoder. Optionally, more than one data decoder may be used to receive the same data type.

In step 710, the microprocessor 300 sends control signals 640 to the power relays 620 to provide power to the receiver component 506 via $V_{BUS}$ 610. Based on the voltage level read from the ID pin 606, the microprocessor 300 may identify that the receiver component 506 is associated with a particular voltage level other than 5V, such as 3V. Therefore, the power level on $V_{BUS}$ 610 may be different from one type of receiver component to the next.

In step 712, the microprocessor 300 launches one or more applications stored in memory 306. The applications are associated with the type of data being transmitted. The applications process and prepare the received transmission data for output and/or further processing.

In step 714, the microprocessor 300 outputs data associated with the received transmission data in addition to the GPS data. For example, the received transmission data, such as TMC data, may be output in a portion of the display 310 or as an overlay to the GPS map data currently being displayed. Commands telling a consumer when to turn left or right, for example, may be output through the speakers 344 or head phones. In the XM data transmission system, XM outputs audio data in parallel with digital data. Music received from the XM data transmission system may be output through the speakers 344 or head phones, while alphanumeric data, such as corresponding song title and/or artist, may be displayed on a portion of the display 310. Weather and traffic data may also be displayed on the display 310. The display 310 may display different data in segments or quadrants, as an overlay, ticker display, rolling display, and the like. Alternatively, the display 310 may display received transmission data without displaying the GPS data.

For example, received transmission data may include real-time traffic, accident, road closure, scheduled road maintenance, orange barrel or other alerts, blockage/spill data, and weather such as rain and snow detected or forecasted. The navigation device 100 may prompt the user as to whether a route should be calculated or recalculated based on one or all of the received data. In another example, the navigation device 100 may indicate on the display 310 which streets and/or geographical areas are impacted by the received transmission data. In another example, the navigation device 100 may be programmed by the user to auto-reroute based on received transmission data. In yet another example, the navigation device 100 may utilize received transmission data to assist a user in planning a route based on longer range weather and traffic forecasts, such as hours or days in the future, enabling the user to avoid delays caused by road construction, snow storms, or other factors.

To determine whether the receiver component 506 is still interconnected with the navigation device 100, power usage may be monitored through the Vbus pin 610 or the voltage level may be monitored at ID pin 616. In addition, the navigation device 100 may provide an error message to the user when no data is being received, such as when the receiver component 506 is faulty or out of range of its transmission source. Also, the navigation device 100 may provide a message to the user when the receiver component 506 is connected to and disconnected from the navigation device 100.

While the invention has been described in terms of various specific embodiments, those skilled in the art will recognize that the invention can be practiced with modification within the spirit and scope of the claims.

What is claimed is:

1. An electronic navigation device comprising:
   a data receiver;
   a Global Positioning System (GPS) navigation device having at least one microprocessor;
   a multi-pin connector including data pins for connecting said data receiver and said navigation device;
   relays for connecting to said data pins; and
   at least one data decoder for connecting to said relays;
   wherein said microprocessor is operable for identifying a type of data transmission system associated with said data receiver and for directing said relays to connect said data pins to one of said at least one data decoder based on said type of data transmission system.

2. The device of claim 1, wherein said data receiver receiving satellite radio data formatted according to one of XM data and Sirius data.

3. The device of claim 1, wherein said data receiver receiving data formatted according to one of Traffic Message Channel, Clear Channel Communications, Inc., audio, audio stereo, and mouse input.

4. The device of claim 1, said data receiver further comprising a resistor network being connected to said multi-pin connector, said resistor network having a resistance value being based on said type of data transmission system.

5. The device of claim 1, said data receiver further comprising a resistor network being connected to said multi-pin connector, said resistor network having a resistance value being equal to one of at least 10 predefined resistance values, each of said at least 10 predefined resistance values being associated with a different type of transmission system.

6. An electronic navigation device comprising:
   a data receiver;
   a Global Positioning System (GPS) navigation device having at least one microprocessor; and
   a multi-pin connector for connecting said data receiver and said navigation device, wherein said microprocessor identifying a type of data transmission system associated with said data receiver and configuring said device according to the identified type of data transmission,
   said data receiver further comprising a resistor network being connected to said multi-pin connector, said resistor network having a resistance value being equal to one of at least 10 predefined resistance values, each of said at least 10 predefined resistance values being associated with a different type of transmission system.

7. The device of claim 6, wherein said data receiver receiving satellite radio data formatted according to one of XM data and Sirius data.

8. The device of claim 6, wherein said data receiver receiving data formatted according to one of Traffic Message Channel, Clear Channel Communications, Inc., audio, audio stereo, and mouse input.

9. The device of claim 6, said device further comprising:
relays for connecting to data pins within said multi-pin connector; and
at least one data decoder for connecting to said relays, said microprocessor directing said relays to connect said data pins to one of said at least one data decoder based on said type of data transmission system.

10. The device of claim 6, said data receiver further comprising a resistor network being connected to said multi-pin connector, said resistor network having a resistance value being based on said type of data transmission system.

11. An electronic navigation device comprising:
a data receiver;
a Global Positioning System (GPS) navigation device having at least one microprocessor; and
a multi-pin connector for connecting said data receiver and said navigation device, wherein said microprocessor configures said device to act as a master when the data receiver is connected thereto, wherein said microprocessor identifies a type of data transmission system associated with said data receiver, wherein said microprocessor configures said device according to the identified type of data transmission, and wherein said microprocessor configures said device to act as a slave when a personal computer is connected thereto.

12. The device of claim 11, wherein said data receiver receiving satellite radio data formatted according to one of XM data and Sirius data.

13. The device of claim 11, wherein said data receiver receiving data formatted according to one of Traffic Message Channel, Clear Channel Communications, Inc., audio, audio stereo, and mouse input.

14. The device of claim 11, said device further comprising:
relays for connecting to data pins within said multi-pin connector; and
at least one data decoder for connecting to said relays, said microprocessor directing said relays to connect said data pins to one of said at least one data decoder based on said type of data transmission system.

15. The device of claim 11, said data receiver further comprising a resistor network being connected to said multi-pin connector, said resistor network having a resistance value being based on said type of data transmission system.

16. The device of claim 11, said data receiver further comprising a resistor network being connected to said multi-pin connector, said resistor network having a resistance value being equal to one of at least 10 predefined resistance values, each of said at least 10 predefined resistance values being associated with a different type of transmission system.

* * * * *